P. S. Devlan.
Screw Propeller.
No. 7,376
Patented May 21, 1850.
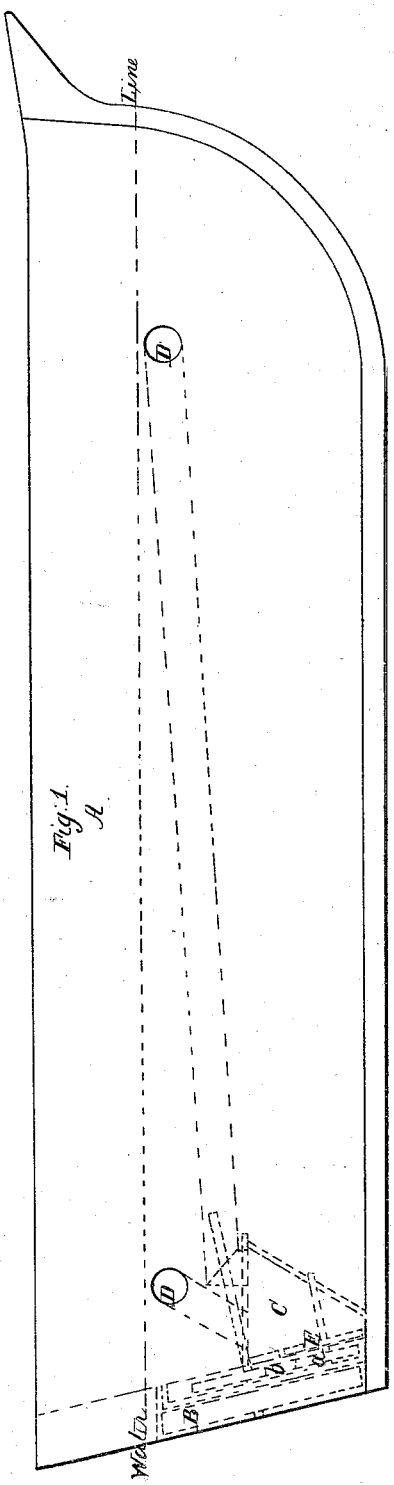
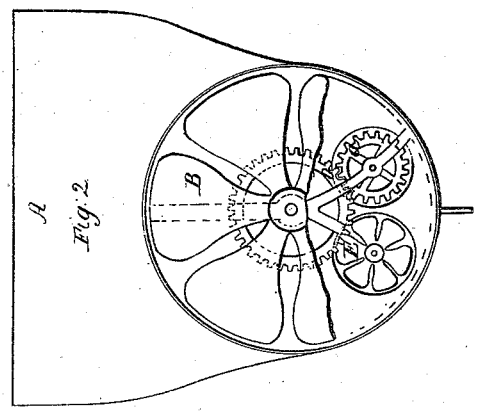

UNITED STATES PATENT OFFICE.

PATRICK S. DEVLAN, OF READING, PENNSYLVANIA.

ARRANGEMENT AND CONNECTION OF SCREW-PROPELLERS.

Specification forming part of Letters Patent No. 7,376, dated May 21, 1850.

*To all whom it may concern:*

Be it known that I, PATRICK S. DEVLAN, of Reading, in the county of Berks and State of Pennsylvania, have invented a new and useful Improvement in Screw-Propellers, of which the following is a full, clear, and exact description, reference being had to the accompanying drawings, which form part of this specification, and in which—

Figure 1 represents a side elevation, and Fig. 2 a stern elevation, of a vessel's hull fitted with my apparatus.

My propelling apparatus is composed of a principal and one or more supplementary propellers suitably secured at the stern of the vessel, connected together by cog-wheels and inclosed in a chamber the hinder side of which is open to the water. Water is supplied to the front side of the propeller-chamber by pipes which pass through the vessel and deliver it to a water-chamber immediately in front of the propeller-chamber and communicating with it by circular apertures, in which the smaller propellers are placed.

In the drawings, A is the hull of the vessel, to the stern of which the propellers are adapted. The larger of these B is driven by the engine in the usual manner, and is inclosed in a chamber open at its hinder side to the water. Immediately in front of this chamber a second chamber C is constructed, which communicates with the former by two circular apertures. It also communicates with the water at the quarters and bows of the vessel by pipes D D. The apertures are fitted with small propellers E, to whose shafts cog-wheels $a$ are secured, whose teeth engage with those of a corresponding wheel $b$ on the shaft of the larger propeller. When the larger propeller is put in motion, the water rushes through the pipes to supply that thrown backward by the larger propeller, and, acting upon the smaller propellers, turns them with considerable force. They in turn, acting through the gearing upon the larger propeller, assist in putting it in motion.

What I claim as my invention, and desire to secure by Letters Patent, is—

The arrangement of the principal and auxiliary propellers, connected by cog-gearing or its equivalent, with that of the water-pipes, in the manner and for the purposes substantially as herein set forth.

PATRICK S. DEVLAN.

Witnesses:
F. G. DWIGHT,
SAML. H. KUTZ.